(12) United States Patent
Wakana et al.

(10) Patent No.: US 9,339,046 B2
(45) Date of Patent: May 17, 2016

(54) FROZEN FRESH CREAM TO BE WHIPPED, METHOD FOR PRODUCING THE FROZEN FRESH CREAM, WHIPPED CREAM, AND METHOD FOR PRODUCING THE WHIPPED CREAM

(75) Inventors: Satoru Wakana, Itabashi-ku (JP); Kiyoshi Hasegawa, Itabashi-ku (JP); Takayasu Takahashi, Itabashi-ku (JP)

(73) Assignee: ORIENTAL YEAST CO., LTD., Tokyo (JP)

( * ) Notice: Subject to any disclaimer, the term of this patent is extended or adjusted under 35 U.S.C. 154(b) by 255 days.

(21) Appl. No.: 13/555,619

(22) Filed: Jul. 23, 2012

(65) Prior Publication Data
US 2013/0071540 A1    Mar. 21, 2013

Related U.S. Application Data

(63) Continuation of application No. PCT/JP2011/071341, filed on Sep. 20, 2011.

(51) Int. Cl.
*A23C 13/00* (2006.01)
*A23C 13/08* (2006.01)

(52) U.S. Cl.
CPC ........... *A23C 13/085* (2013.01); *A23C 2210/30* (2013.01)

(58) Field of Classification Search
USPC .......................... 426/564, 565, 570, 586, 524
See application file for complete search history.

(56) References Cited

U.S. PATENT DOCUMENTS

| | | | |
|---|---|---|---|
| 2,260,450 A | 10/1941 | Guinane | |
| 4,251,560 A | 2/1981 | Dell et al. | |
| 4,578,276 A | 3/1986 | Morley | |
| 6,510,890 B1 * | 1/2003 | Paskach et al. | 165/61 |
| 2005/0003057 A1 | 1/2005 | Takahashi et al. | |

FOREIGN PATENT DOCUMENTS

| | | |
|---|---|---|
| EP | 1238589 | 9/2002 |
| GB | 497649 | 12/1938 |
| JP | 52-079059 | 7/1977 |
| JP | 55-015722 | 2/1980 |
| JP | 58-051864 | 3/1983 |
| JP | 07-000092 | 1/1995 |
| JP | 2000-236809 | 9/2000 |
| JP | 2002-272436 | 9/2002 |
| JP | 2003-180314 | 7/2003 |
| JP | 2005-198605 | 7/2005 |
| JP | 2008-118916 | 5/2008 |

OTHER PUBLICATIONS

Million "Can you freeze fresh cream", Yahoo Answers, p. 1 http://uk.answers.yahoo.com/question/index?qid=20061215162616AAZZyZJ printed Mar. 4, 2014, published at least seven years prior.*
UNL Food "Refrigerated and Freezer Storage", pp. 1-3, http://food.unl.edu/safety/refrigerator-freezer Apr. 25, 2007.*
Campos et al "Effect of cooling rate on the structure and mechanical properties of milk fat and lard", Food Research International 35 (2002) pp. 971-981.*
National Center for Home Food Preservation "Thawing and Preparing Foods for Serving", pp. 1-3 http://nchfp.uga.edu/how/freeze/thawing.html Feb. 2001.*
Sawayama, "Science of Cooking <Analyzing Taste, Material and Processing method> 97 Basic Knowledge on Cream," Confectionery and Breadmaking, Jan. 2007, vol. 73, No. 1, pp. 147-149 (English translation provided).
Lopez et al., "Thermal and Structural Behavior of Milk Fat: 3. Influence of Cooling Rate and Droplet Size on Cream Crystallization," Journal of Colloid and Interface Science, 2002, vol. 254, issue 1, pp. 64-78.
Faydi et al., "Experimental study and modelling of the ice crystal morphology of model standard ice cream. Part I: direct characterization method and experimental data," Journal of Food Engineering, 2001, vol. 48, pp. 283-291.
Loewenstein et al,, "HTST and UHT pasteurization of ice cream, Part II: the influence of varying heat treatments on the effectiveness of some stabilizing agents," American Dairy Review, 1972, vol. 34, No. 10, pp. 42-46, 52-53.
Leggett, "Some factors which affect the properties of whipping cream," Int. Dairy Congr., Proc., 1966, 5, pp. 347-355.
Alcaide et al., "Freezing and freeze-drying methods to preserve cream," Afinidad, 1979, 36(362), pp. 342-344.

* cited by examiner

*Primary Examiner* — Kelly Bekker
(74) *Attorney, Agent, or Firm* — Hamre, Schumann, Mueller & Larson, P.C.

(57) ABSTRACT

A method for producing frozen fresh cream to be whipped, the method including: cooling fresh cream, wherein in the cooling, the fresh cream is cooled to a temperature of −5° C. or lower and is changed from 0° C. to −5° C. for 8 minutes or shorter.

6 Claims, 1 Drawing Sheet

FROZEN FRESH CREAM TO BE WHIPPED, METHOD FOR PRODUCING THE FROZEN FRESH CREAM, WHIPPED CREAM, AND METHOD FOR PRODUCING THE WHIPPED CREAM

CROSS-REFERENCE TO RELATED APPLICATION

This is a continuation application of PCT/JP2011/071341, filed on Sep. 20, 2011.

BACKGROUND OF THE INVENTION

1. Field of the Invention

The present invention relates to frozen fresh cream to be whipped, a method for producing the frozen fresh cream, whipped cream, and a method for producing the whipped cream.

2. Description of the Related Art

According to the Ministerial Ordinance on Milk and Milk products Concerning Compositional Standards, etc. in Japan, cream is defined as follows: "cream means the product which is obtained by removal of components other than milk fat from raw milk, cow's milk or special milk." Also, in the "Compositional Standards and Standards of Storing Condition of Milk Products" of this Ministerial Ordinance, the "Compositional Standards" are defined as follows: "Milk fat content: 18.0% or higher, Acidity (as lactic acid): 0.20% or lower, Bacterial count (per 1 mL by standard plate count method): 100,000 or lower, Coliforms: Negative," and "Standards of Manufacturing Process" and "Standards of Storing Condition" are also stipulated. Besides these definitions, "fresh" cream has to satisfy the condition that no additives such as vegetable oil and fat and an emulsifying agent are added.

The fresh cream is whipped (hereinafter may be referred to as "beaten" or "foamed") and then used in, for example, decoration of cakes.

Even when whipping the fresh cream that has been frozen and thawed, the obtained whipped cream is considerably degraded in quality, which is problematic. Thus, it is common knowledge among those skilled in the art to avoid freezing fresh cream to be used for whipped cream (see, for example, Shigeru Sawayama, "Science of Cooking <Analyzing Taste, Material and Processing method> 97 Basic Knowledge on Cream," Confectionery and Breadmaking, January, 2007, Vol. 73, No. 1, pp. 147-149).

In order to the above-described problems, for example, there has been proposed cream which is produced by homogenizing under a predetermined pressure a raw material containing an emulsifying agent, etc, mixed and which can achieve excellent whip topping regardless of the time when thawed after long-term freezing for storage (see, for example, Japanese Patent Application Laid-Open (JP-A) No. 52-79059). However, the above proposed cream contains an emulsifying agent and thus is not fresh cream. In addition, it is degraded in flavor and is against the recent trend toward the use of natural ingredients, which is problematic.

Besides, there has been proposed frozen whipped cream produced by whipping cream and freezing it (see, for example, JP-A No. 58-51864). However, the above proposed frozen whipped cream also contains an emulsifying agent and thus is not fresh cream. In addition, it is degraded in flavor and is against the recent trend toward use of natural ingredients, which is problematic.

Under such circumstances, at present, fresh cream to be whipped is stored and distributed in a state of being refrigerated (3° C. to 10° C.) rather than being frozen.

The recent interest has been focusing on organic foods, reflecting the consumers' trend toward the use of natural ingredients. However, it cannot be said that Japan has a sufficient amount of organic milk required for producing organic fresh cream. As a result, Japan is facing difficulties in producing organic fresh cream. Thus, importing organic fresh cream from foreign countries becomes one possible means.

Here, the storage and the like of fresh cream to be whipped are performed in a state of being refrigerated as described above and thus its freshness date is short, which is a severe problem especially when importing it. There is a strong need to solve this problem.

In Japan, an excess amount of milk produced is disposed of, and some attempts have been made to find a new way to use such milk to be disposed of and effectively utilize it.

Thus, at present, keen demand has arisen for development of frozen fresh cream to be whipped which can be frozen for storage, which is comparable to refrigerated fresh cream in properties of cream after thawed, and which is comparable to whipped cream prepared by whipping refrigerated fresh cream in qualities such as smoothness and melt-in-the-mouth when formed into whipped cream.

SUMMARY OF THE INVENTION

The present invention aims to solve the above existing problems and achieve the following objects. Specifically, an object of the present invention is to provide the following: a method for producing frozen fresh cream to be whipped which can be frozen for storage, which is comparable to refrigerated fresh cream in properties of cream after thawed, and which is comparable to whipped cream prepared by whipping refrigerated fresh cream in qualities such as smoothness and melt-in-the-mouth when formed into whipped cream; frozen fresh cream to be whipped produced by the method for producing frozen fresh cream to be whipped; whipped cream produced from the frozen fresh cream to be whipped; and a method for producing the whipped cream.

The present inventors conducted extensive studies to achieve the above objects, and as a result found that by changing the temperature of fresh cream from 0° C. to −5° C. for 8 minutes or shorter, the obtained frozen fresh cream to be whipped can be frozen for storage, is comparable to refrigerated fresh cream in properties of cream after thawed, and is comparable to whipped cream prepared by whipping refrigerated fresh cream in qualities such as smoothness and melt-in-the-mouth when formed into whipped cream. Also, surprisingly, even when such frozen fresh cream to be whipped, which is produced by changing the temperature of fresh cream from 0° C. to −5° C. for 8 minutes or shorter, is thawed under strict conditions that it is slowly changed from −5° C. to 0° C. called a zone of maximum ice crystal formation; i.e., is thawed by, for example, being left to stand still in a refrigerator without using a special thawing unit, it has been found that the thawed product is comparable to refrigerated fresh cream in properties as cream after thawed, and is comparable to whipped cream prepared by whipping refrigerated fresh cream in qualities such as smoothness and melt-in-the-mouth when formed into whipped cream. On the basis of the above findings, the present inventors have accomplished the present invention.

The present invention is based on the above findings obtained by the present inventors. Means for solving the above-described problems are as follows.

<1> A method for producing frozen fresh cream to be whipped, the method including:
  cooling fresh cream,
  wherein in the cooling, the fresh cream is cooled to a temperature of −5° C. or lower and is changed from 0° C. to −5° C. for 8 minutes or shorter.

<2> The method according to <1>, wherein in the cooling, the fresh cream is cooled to at least −20° C.

<3> The method according to <1> or <2>, wherein in the cooling, the fresh cream is cooled to a temperature of −20° C. or lower and is changed from −5° C. to −20° C. for 9 minutes or shorter.

<4> Frozen fresh cream to be whipped produced by the method according to any one of <1> to <3>.

<5> A method for producing whipped cream, the method including:
  thawing at 3° C. to 10° C. frozen fresh cream to be whipped produced by the method according to any one of <1> to <3>; and
  whipping the thawed fresh cream obtained in the thawing.

<6> Whipped cream produced by the method according to <5>.

The present invention can provide: a method for producing frozen fresh cream to be whipped which can be frozen for storage, which is comparable to refrigerated fresh cream in properties of cream after thawed, and which is comparable to whipped cream prepared by whipping refrigerated fresh cream in qualities such as smoothness and melt-in-the-mouth when formed into whipped cream; frozen fresh cream to be whipped produced by the method for producing frozen fresh cream to be whipped; whipped cream produced from the frozen fresh cream to be whipped; and a method for producing the whipped cream. These can solve the above problems and achieve the above objects.

Figure 1:
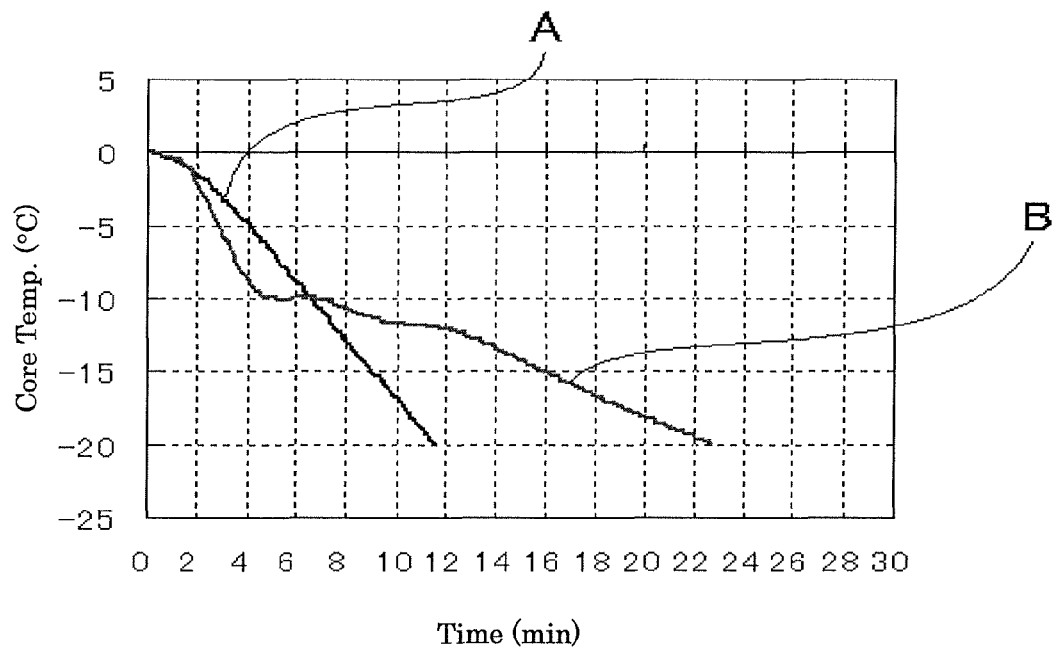
FIG. 1 is a graph of the change in the core temperature of the fresh cream in the cooling step of Examples 1 and 2.

DETAILED DESCRIPTION OF THE INVENTION (Frozen Fresh Cream to be Whipped)

Frozen fresh cream to be whipped of the present invention can be produced by a method of the present invention for producing frozen fresh cream to be whipped.

Next will be described the frozen fresh cream to be whipped of the present invention as well as the method of the present invention for producing frozen fresh cream to be whipped.

(Method for Producing Frozen Fresh Cream to be Whipped)

The method of the present invention for producing frozen fresh cream to be whipped includes at least a cooling step; and, if necessary, further includes other steps.

<Cooling Step>

The cooling step is a step of cooling fresh cream to freeze the fresh cream.

<<Fresh Cream>>

The fresh cream refers to fresh cream stipulated in the Ministerial Ordinance on Milk and Milk products Concerning Compositional Standards, etc. The fresh cream is un-whipped fresh cream to be frozen for storage, unlike whipped cream conventionally frozen for storage.

The fresh cream used may be fresh cream immediately after production from milk, or may be commercially available refrigerated fresh cream.

The amount of milk fat contained in the fresh cream is not particularly limited and may be appropriately selected depending on the intended purpose.

<<Terminal Temperature of Cooling>>

The terminal temperature of cooling of the fresh cream is not particularly limited, so long as the fresh cream can be frozen, and may be appropriately selected depending on the intended purpose. The terminal temperature of cooling of the fresh cream is preferably −60° C. to −20° C., more preferably −40° C. to −20° C., particularly preferably about −20° C.

When the cooling temperature of the fresh cream is lower than −60° C., considerable time and cost for cooling may be required. When the cooling temperature of the fresh cream is higher than −20° C., the fresh cream is not sufficiently frozen in some cases. When the cooling temperature of the fresh cream is about −20° C., the time and cost for cooling are efficient. This cooling temperature is advantageous in that the frozen fresh cream is not changed in temperature very much even in distribution, and is excellent in properties as cream after thawed and is excellent in quality when formed into whipped cream.

In the present invention, the temperature of the above fresh cream refers to a temperature at a central portion of fresh cream to be cooled (hereinafter may be referred to "core temperature").

The measuring device for measuring the core temperature is not particularly limited and may be appropriately selected depending on the intended purpose. Examples of the measuring device include AM-8000 Series (product of Anritsu Meter Co., Ltd.).

The core temperature can be measured by setting a temperature sensor of the measuring device from outside of a container of the fresh cream so that the temperature sensor is located at the center of the above fresh cream.

<<Cooling Time from 0° C. to −5° C.>>

In the cooling step, the core temperature of the fresh cream is cooled to a temperature of −5° C. or lower and changed from 0° C. to −5° C. for 8 minutes or shorter. By adjusting the cooling time to 8 minutes or shorter, fat globules in fresh cream can be prevented from being broken. As a result, presumably, the obtained product has properties as cream after thawed that are comparable to fresh cream refrigerated for storage, and also has qualities such as smoothness and melt-in-the-mouth when formed into whipped cream that are comparable to fresh cream refrigerated for storage.

The cooling time required that the core temperature of the fresh cream is changed from 0° C. to −5° C. is not particularly limited, so long as it is 8 minutes or shorter, and may be appropriately selected depending on the intended purpose. The cooling time is preferably 7 minutes or shorter, more preferably 6 minutes or shorter, particularly preferably 5 minutes or shorter.

When the cooling time required that the core temperature of the fresh cream is changed from 0° C. to −5° C. is longer than 8 minutes, the obtained product may be degraded in qualities when thawed and formed into whipped cream. Whereas when the cooling time required that the core temperature of the fresh cream is changed from 0° C. to −5° C. is 5 minutes or shorter, the obtained product is more excellent in properties as cream after thawed and in qualities when formed into whipped cream, which is advantageous.

<<<Cooling Rate from 0° C. to −5° C.>>>

The cooling rate of the core temperature of the fresh cream from 0° C. to −5° C. is not particularly limited, so long as the core temperature of the fresh cream is changed from 0° C. to −5° C. for 8 minutes or shorter, and may be appropriately selected depending on the intended purpose. The cooling rate thereof is preferably 0.7° C./min to 6° C./min, more preferably 0.9° C./min to 6° C./min, particularly preferably 1.0° C./min to 6° C./min.

When the cooling rate of the core temperature of the fresh cream from 0° C. to −5° C. is less than 0.7° C./min, the cooling rate is slow and thus the obtained product may be degraded in qualities when thawed and formed into whipped cream. Whereas it is more than 6° C./min, the cost for cooling may be elevated. When the cooling rate of the core temperature of the fresh cream from 0° C. to −5° C. falls within the above particularly preferable range, frozen fresh cream to be whipped can efficiently be produced, and also the obtained product is more excellent in properties as cream after thawed and in qualities when formed into whipped cream, which is advantageous.

The cooling rate of the core temperature of the fresh cream from 0° C. to −5° C. may be a constant rate or a non-constant rate. It is preferably a constant rate since the obtained product is more excellent in properties as cream after thawed and in qualities when formed into whipped cream.

<<Cooling Time from 0° C. to −20° C.>>

In the cooling step, the fresh cream may be cooled to a temperature of −20° C. or lower. Here, the time required that the core temperature of the fresh cream is changed from 0° C. to −20° C. is not particularly limited and may be appropriately selected depending on the intended purpose. It is preferably 40 minutes or shorter, more preferably 25 minutes or shorter, particularly preferably 15 minutes or shorter.

When the time required that the core temperature of the fresh cream is changed from 0° C. to −20° C. is longer than 40 minutes, the obtained product may be degraded in qualities when thawed and formed into whipped cream. When the time required that the core temperature of the fresh cream is changed from 0° C. to −20° C. is 15 minutes or shorter, the obtained product is more excellent in properties as cream after thawed and in qualities when formed into, whipped cream, which is advantageous.

<<<Cooling Rate from 0° C. to −20° C.>>>

The cooling rate of the core temperature of the fresh cream from 0° C. to −20° C. is not particularly limited and may be appropriately selected depending on the intended purpose. The cooling rate thereof is preferably 0.5° C./min to 2.5° C./min, more preferably 0.8° C./min to 2.5° C./min, particularly preferably 1.3° C./min to 2.5° C./min.

When the cooling rate of the core temperature of the fresh cream from 0° C. to −20° C. is less than 0.5° C./min, the cooling rate is slow and thus the obtained product may be degraded in qualities when thawed and formed into whipped cream. Whereas it is more than 2.5° C./min, the cost for cooling may be elevated. When the cooling rate of the core temperature of the fresh cream from 0° C. to −20° C. falls within the above particularly preferable range, frozen fresh cream to be whipped can efficiently be produced, and also the obtained product is more excellent in properties as cream after thawed and in qualities when formed into whipped cream, which is advantageous.

The cooling rate of the core temperature of the fresh cream from 0° C. to −20° C. may be a constant rate or a non-constant rate. It is preferably a constant rate since the obtained product is more excellent in properties as cream after thawed and in qualities when formed into whipped cream.

<<Cooling Time from −5° C. to −20° C.>>

In the cooling step, the fresh cream may be cooled to a temperature of −20° C. or lower. Here, the time required that the core temperature of the fresh cream is changed from −5° C. to −20° C. is not particularly limited and may be appropriately selected depending on the intended purpose. It is preferably 25 minutes or shorter, more preferably 20 minutes or shorter, particularly preferably 9 minutes or shorter.

When the time required that the core temperature of the fresh cream is changed from −5° C. to −20° C. is longer than 25 minutes, the obtained product may be degraded in qualities when thawed and formed into whipped cream. When the time required that the core temperature of the fresh cream is changed from −5° C. to −20° C. is 9 minutes or shorter, the obtained product is more excellent in properties as cream after thawed and in qualities when formed into whipped cream, which is advantageous.

<<<Cooling Rate from −5° C. to −20° C.>>>

The cooling rate of the core temperature of the fresh cream from −5° C. to −20° C. is not particularly limited and may be appropriately selected depending on the intended purpose. The cooling rate thereof is preferably 0.6° C./min to 3° C./min, more preferably 0.8° C./min to 3° C./min, particularly preferably 1.7° C./min to 3° C./min.

When the cooling rate of the core temperature of the fresh cream from −5° C. to −20° C. is less than 0.6° C./min, the cooling rate is slow and thus the obtained product may be degraded in qualities when thawed and formed into whipped cream. Whereas it is more than 3° C./min, the cost for cooling may be elevated. When the cooling rate of the core temperature of the fresh cream from −5° C. to −20° C. falls within the above particularly preferable range, frozen fresh cream to be whipped can efficiently be produced, and also the obtained product is more excellent in properties as cream after thawed and in qualities when formed into whipped cream, which is advantageous.

The cooling rate of the core temperature of the fresh cream from −5° C. to −20° C. may be a constant rate or a non-constant rate. It is preferably a constant rate since the obtained product is more excellent in properties as cream after thawed and in qualities when formed into whipped cream.

<<Cooling Unit>>

The cooling unit used in the cooling step is not particularly limited, so long as the core temperature of the fresh cream can be changed from 0° C. to −5° C. for 8 minutes or shorter, and may be appropriately selected depending on the intended purpose. Liquid nitrogen is preferably used from the viewpoint of cooling for a short time.

The cooling device using liquid nitrogen is not particularly limited and may be appropriately selected depending on the intended purpose. Examples of the cooling device include BOX FREEZER (BF-350, BF-600, BF-1000: these products are of SHOWA TANSAN CO., LTD.) and TUNNEL FREEZER (TF-2000, TF-3000, TF-4000, TF-6000: these products are of SHOWA TANSAN CO., LTD.).

The core temperature of the fresh cream can be adjusted by appropriately setting the cooling device. For example, the core temperature thereof can be adjusted by adjusting the temperature in a container to −100° C. to −130° C. with the cooling device using liquid nitrogen. The temperature in the container set in the cooling step may be constant or variably changed.

<Other Steps>

The other steps are not particularly limited, so long as the effects of the present invention are not impaired, and may be appropriately selected depending on the intended purpose. Examples thereof include a precooling step.

<<Precooling Step>>

The precooling step is a step of cooling fresh cream refrigerated (at 3° C. to 10° C.) to about 0° C. in advance.

Through provision of the precooling step, it is possible to rapidly perform cooling in the cooling step.

The cooling unit used in the precooling step is not particularly limited and may be appropriately selected depending on the intended purpose. For example, the same cooling units as used in the cooling step can be used as the cooling unit in the precooling step.

(Whipped Cream)

Whipped cream of the present invention can be produced by a method of the present invention for producing whipped cream. The whipped cream of the present invention has qualities such as smoothness and melt-in-the-mouth that are comparable to whipped cream produced by whipping fresh cream refrigerated for storage.

Next will be described the whipped cream of the present invention as well as the method of the present invention for producing whipped cream.

(Method for Producing Whipped Cream)

The method of the present invention for producing whipped cream includes at least a thawing step and a whipping step; and, if necessary, further includes other steps.

<Thawing Step>

The thawing step is a step of thawing at 3° C. to 10° C. the frozen fresh cream to be whipped produced by the method of the present invention for producing frozen fresh cream to be whipped.

<<Thawing Temperature, Thawing Time, and Thawing Method>>

The thawing temperature of the frozen fresh cream to be whipped is not particularly limited, so long as it is 3° C. to 10° C., and may be appropriately selected depending on the intended purpose.

The thawing time of the frozen fresh cream to be whipped is not particularly limited and may be appropriately selected depending on the intended purpose. It is, for example, 5 hours to 60 hours.

The thawing method of the frozen fresh cream to be whipped is not particularly limited and may be appropriately selected depending on the intended purpose. Examples of the thawing method include a method in which the frozen fresh cream to be whipped is thawed with left to stand still in a refrigerator (fridge) and a method in which the frozen fresh cream to be whipped is thawed with running water. Among them, preferred is a method in which the frozen fresh cream to be whipped is thawed with left to stand still in a refrigerator, since the frozen fresh cream to be whipped can be thawed in a simple manner.

<Whipping Step>

The whipping step is a step of whipping the thawed fresh cream obtained in the thawing step.

<<Temperature, Time, and Method>>

The temperature for whipping the fresh cream is not particularly limited and may be appropriately selected depending on the intended purpose.

The method for whipping the fresh cream is not particularly limited and may be appropriately selected depending on the intended purpose. Examples thereof include a method in which the fresh cream is whipped using an instrument and a method in which the fresh cream is whipped manually.

The instrument is not particularly limited and may be appropriately selected from known instruments. Examples thereof include HAND MIXER (product of HOME ELECTRIC Co.).

Whipping the fresh cream is preferably performed while the fresh cream is being indirectly cooled on ice.

<Other Steps>

The other steps are not particularly limited, so long as the effects of the present invention are not impaired, and may be appropriately selected depending on the intended purpose. Examples thereof include a storing step.

<<Storing Step>>

The storing step is a step of storing the thawed fresh cream.

In the method of the present invention for producing whipped cream, the whipping step may be performed subsequent to the thawing step, or the whipping step may be performed at a desired time via the storing step.

—Storing Temperature—

The storing temperature is not particularly limited and may be appropriately selected depending on the intended purpose. It is, for example, 3° C. to 10° C.

EXAMPLES

The present invention will next be described by way of Referential Examples, Examples, and Comparative Examples. However, the present invention should not be construed as being limited to Examples.

Referential Example 1

Fresh Cream Refrigerated For Storage

As a control, there was provided fresh cream (trade name: FRESH CREAM 38, 1,000 mL, milk fat content: 38% by mass, product of Meiji K.K.) which had been refrigerated (5° C., stored in a refrigerator).

—Evaluation of Properties of Cream—

After the container of the fresh cream had been opened, the fresh cream was visually observed for properties or state. It was found that the fresh cream was smooth, and also there were no solids attached to the inner surface of the container.

<Production of Whipped Cream>

<<Whipping Step>>

Sugar was added to the fresh cream of Referential Example 1 in an amount of 7% by mass relative to the mass of the fresh cream. The resultant mixture was placed in a 500-mL bowl. While being indirectly cooled on ice, the mixture was whipped using HAND MIXER (HOME ELECTRIC Co.) at SPEEDS for 4 minutes, to thereby produce whipped cream.

—Evaluation of Whipped Cream—

——Over-Run——

The over-run (%) of the whipped cream of Referential Example 1 was calculated from the following equation (1) and was found to be 114%.

$$\text{Over-run (\%) of whipped cream} = \{(A-B)/B\} \times 100 \quad (1)$$

In equation (1), "A" denotes "a mass of cream before whipping per a volume of 500 mL" and "B" denotes "a mass of cream after whipping per a volume of 500 mL."

——Organoleptic Evaluation——

The whipped cream of Referential Example 1 was evaluated for smoothness and melt-in-the-mouth by 5 panelists. Notably, the smoothness and the melt-in-the-mouth of the whipped cream of Referential Example 1 were used as standards (evaluation score: 3) to evaluate the smoothness and the melt-in-the-mouth of whipped cream of Examples and Comparative Examples described below.

The whipped cream of Referential Example 1 was found to give smooth feeling on the tongue and no granular feeling.

Example 1

Fresh Cream-1 Frozen Using Liquid Nitrogen

<Production of Frozen Fresh Cream to be Whipped>
<<Cooling Step>>

As fresh cream, there was provided the same product as FRESH CREAM 38 used in Referential Example 1.

Using, as the cooling unit, a box-type freezer (product of SHOWA TANSAN CO., LTD., BF-350) using liquid nitrogen as a refrigerant, the fresh cream was subjected to the cooling step with the temperature in the freezer set to −130° C.

The change in the temperature (core temperature) of the fresh cream in the cooling step was measured using AM-8000E (product of Anritsu Meter Co., Ltd.) by setting a temperature sensor of the measuring device from outside of a container of the fresh cream so that the temperature sensor was located at the center of the fresh cream.

The cooling step was performed until the core temperature of the fresh cream became −20° C., and the obtained frozen fresh cream to be whipped was stored in a freezer set to −20° C.

The time required that the core temperature of the fresh cream was changed from 0° C. to −5° C. in the cooling step was 4.2 minutes, and the cooling rate was 1.2° C./min.

The time required that the core temperature of the fresh cream was changed from 0° C. to −20° C. in the cooling step was 11.6 minutes, and the cooling rate was 1.7° C./min.

The time required that the core temperature of the fresh cream was changed from −5° C. to −20° C. in the cooling step was 7.4 minutes, and the cooling rate was 2.0° C./min.

The change in the core temperature of the fresh cream in the cooling step is shown in FIG. 1. In FIG. 1, "A" indicates a graph of the change in the core temperature of the fresh cream in the cooling step of Example 1.

<Production of Whipped Cream>
<<Thawing Step>>

After stored in the freezer set to −20° C., the frozen fresh cream to be whipped was thawed by being left to stand still for 48 hours in a refrigerator set to 5° C.

—Evaluation of Properties of Cream—

After the container of the fresh cream had been opened, the thawed fresh cream was visually observed for properties. It was found that the fresh cream was smooth, and also there were no solids attached to the inner surface of the container.

<<Whipping Step>>

The procedure of the whipping step of Referential Example 1 was repeated, except that the fresh cream of Referential Example 1 was changed to the thawed fresh cream of Example 1, to thereby produce whipped cream.

—Evaluation of Whipped Cream—
——Over-Run——

In the same manner as in Referential Example 1, the over-run (%) of the whipped cream was calculated from the above equation (1) and was found to be 114%.

——Organoleptic Evaluation——

In the same manner as in Referential Example 1, the whipped cream was evaluated for smoothness and melt-in-the-mouth by the 5 panelists according to the following criteria. When averaging the evaluation scores given by the 5 panelists, both of the smoothness and the melt-in the mouth were 3. The evaluation scores of the whipped cream were comparable to those of the whipped cream of Referential Example 1.

The whipped cream of Example 1 was found to give smooth feeling on the tongue and no granular feeling.

Criteria for Smoothness
5: Much better than the whipped cream of Referential Example 1
4: Better than the whipped cream of Referential Example 1
3: Comparable to the whipped cream of Referential Example 1
2: Worse than the whipped cream of Referential Example 1
1: Much worse than the whipped cream of Referential Example 1

Criteria for Melt-in-the-Mouth
5: Much better than the whipped cream of Referential Example 1
4: Better than the whipped cream of Referential Example 1
3: Comparable to the whipped cream of Referential Example 1
2: Worse than the whipped cream of Referential Example 1
1: Much worse than the whipped cream of Referential Example 1

Example 2

Fresh Cream-2 Frozen Using Liquid Nitrogen

<Production of Frozen Fresh Cream to be Whipped>
<<Cooling Step>>

As fresh cream, there was provided the same product as FRESH CREAM 38 used in Referential Example 1.

The cooling unit used was a box-type freezer (product of SHOWA TANSAN CO., LTD., BF-350) using liquid nitrogen as a refrigerant. The temperature in the freezer was set to −130° C. until the core temperature of the fresh cream became −5° C. After the core temperature of the fresh cream had reached −5° C., the temperature in the freezer was set to −80° C.

The change in the temperature (core temperature) of the fresh cream in the cooling step was measured in the same manner as in Example 1.

The cooling step was performed until the core temperature of the fresh cream became −20° C., and the obtained frozen fresh cream to be whipped was stored in a refrigerator set to −20° C.

The time required that the core temperature of the fresh cream was changed from 0° C. to −5° C. in the cooling step was 2.9 minutes, and the cooling rate was 1.7° C./min.

The time required that the core temperature of the fresh cream was changed from 0° C. to −20° C. in the cooling step was 22.8 minutes, and the cooling rate was 0.9° C./min.

The time required that the core temperature of the fresh cream was changed from −5° C. to −20° C. in the cooling step was 19.9 minutes, and the cooling rate was 0.8° C./min.

The change in the core temperature of the fresh cream in the cooling step is shown in FIG. 1. In FIG. 1, "B" indicates a graph of the change in the core temperature of the fresh cream in the cooling step of Example 2.

<Production of Whipped Cream>
<<Thawing Step>>

After stored in the freezer set to −20° C., the frozen fresh cream to be whipped was thawed by being left to stand still for 48 hours in a refrigerator set to 5° C.

—Evaluation of Properties of Cream—

After the container of the fresh cream had been opened, the thawed fresh cream was visually observed for properties. It was found that the fresh cream was smooth, and also there were no solids attached to the inner surface of the container.

<<Whipping Step>>

The procedure of the whipping step of Referential Example 1 was repeated, except that the fresh cream of Referential Example 1 was changed to the thawed fresh cream of Example 2, to thereby produce whipped cream.

—Evaluation of Whipped Cream—

——Over-Run——

In the same manner as in Referential Example 1, the over-run (%) of the whipped cream was calculated from the above equation (1) and was found to be 106%.

——Organoleptic Evaluation——

In the same manner as in Example 1, the whipped cream was evaluated for smoothness and melt-in-the-mouth. As a result, the smoothness and the melt-in-the-mouth were respectively 3 and 2 as averages of the evaluation scores given by the 5 panelists.

The whipped cream of Example 2 was found to give smooth feeling on the tongue and no granular feeling but to be somewhat oily. Notably, the whipped cream of Example 2 is whipped cream practically usable.

Comparative Example 1

Fresh Cream Frozen in a Freezer Set to −20° C.

<Production of Frozen Fresh Cream to be Whipped>
<<Cooling Step>>

As fresh cream, there was provided the same product as FRESH CREAM 38 used in Referential Example 1.

The cooling unit used was a freezer set to −20° C. (product of Nihon Freezer Co., Ltd., GSS-3065F3).

The change in the temperature (core temperature) of the fresh cream in the cooling step was measured in the same manner as in Example 1.

The cooling step was performed until the core temperature of the fresh cream became −20° C., and the obtained frozen fresh cream to be whipped was stored in a freezer set to −20° C.

The time required that the core temperature of the fresh cream was changed from 0° C. to −5° C. in the cooling step was 4.8 minutes, and the cooling rate was 0.10° C./rain.

The time required that the core temperature of the fresh cream was changed from 0° C. to −20° C. in the cooling step was 116 minutes, and the cooling rate was 0.17° C./rain.

The time required that the core temperature of the fresh cream was changed from −5° C. to −20° C. in the cooling step was 68 minutes, and the cooling rate was 0.22° C./rain.

Figure 2:
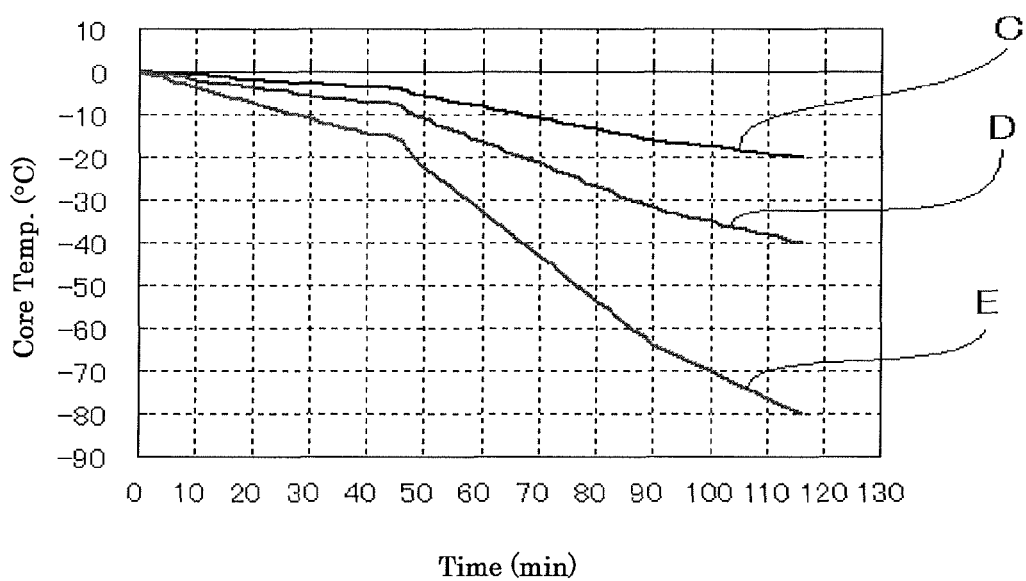
FIG. 2 is a graph of the change in the core temperature of the fresh cream in the cooling step of Comparative Examples 1 to 3.

The change in the core temperature of the fresh cream in the cooling step is shown in FIG. 2. In FIG. 2, "C" indicates a graph of the change in the core temperature of the fresh cream in the cooling step of Comparative Example 1.

<Production of Whipped Cream>
<<Thawing Step>>

After stored in the freezer set to −20° C., the frozen fresh cream to be whipped was thawed by being left to stand still for 48 hours in a refrigerator set to 5° C.

—Evaluation of Properties of Cream—

After the container of the fresh cream had been opened, the thawed fresh cream was visually observed for properties. It was found that there were solids attached to the inner surface of the container and there were numerous aggregates in the liquid.

<<Whipping Step>>

The procedure of the whipping step of Referential Example 1 was repeated, except that the fresh cream of Referential Example 1 was changed to the thawed fresh cream of Comparative Example 1, to thereby produce whipped cream.

—Evaluation of Whipped Cream—

——Over-Run——

In the same manner as in Referential Example 1, the over-run (%) of the whipped cream was calculated from the above equation (1) and was found to be 98%.

——Organoleptic Evaluation——

In the same manner as in Example 1, the whipped cream was evaluated for smoothness and melt-in-the-mouth. As a result, the smoothness and the melt-in-the-mouth were respectively 2 and 1 as averages of the evaluation scores given by the 5 panelists.

The whipped cream of Comparative Example 1 was found to give rough feeling on the tongue and be oily.

Comparative Example 2

Fresh Cream Frozen in a Freezer Set to −40° C.

<Production of Frozen Fresh Cream to be Whipped>
<<Cooling Step>>

As fresh cream, there was provided the same product as FRESH CREAM 38 used in Referential Example 1.

The cooling unit used was a freezer set to −40° C. (product of Nihon Freezer Co., Ltd., SF-3156HC).

The change in the temperature (core temperature) of the fresh cream in the cooling step was measured in the same manner as in Example 1.

The cooling step was performed until the core temperature of the fresh cream became −40° C., and the obtained frozen fresh cream to be whipped was stored in a freezer set to −20° C.

The time required that the core temperature of the fresh cream was changed from 0° C. to −5° C. in the cooling step was 28 minutes, and the cooling rate was 0.18° C./min.

The time required that the core temperature of the fresh cream was changed from 0° C. to −20° C. in the cooling step was 68 minutes, and the cooling rate was 0.29° C./min.

The time required that the core temperature of the fresh cream was changed from −5° C. to −20° C. in the cooling step was 40 minutes, and the cooling rate was 0.38° C./rain.

The change in the core temperature of the fresh cream in the cooling step is shown in FIG. 2. In FIG. 2, "D" indicates a graph of the change in the core temperature of the fresh cream in the cooling step of Comparative Example 2.

<Production of Whipped Cream>
<<Thawing Step>>

After stored in the freezer set to −20° C., the frozen fresh cream to be whipped was thawed by being left to stand still for 48 hours in a refrigerator set to 5° C.

—Evaluation of Properties of Cream—

After the container of the fresh cream had been opened, the thawed fresh cream was visually observed for properties. It was found that there were solids attached to the inner surface of the container and there were numerous aggregates in the liquid.

<<Whipping Step>>

The procedure of the whipping step of Referential Example 1 was repeated, except that the fresh cream of Referential Example 1 was changed to the thawed fresh cream of Comparative Example 2, to thereby produce whipped cream.

—Evaluation of Whipped Cream+

——Over-Run——

In the same manner as in Referential Example 1, the over-run (%) of the whipped cream was calculated from the above equation (1) and was found to be 103%.

——Organoleptic Evaluation——

In the same manner as in Example 1, the whipped cream was evaluated for smoothness and melt-in-the-mouth. As a result, the smoothness and the melt-in-the-mouth were respectively 1 and 1 as averages of the evaluation scores given by the 5 panelists.

The whipped cream of Comparative Example 2 was found to give rough feeling on the tongue and be oily.

Comparative Example 3

Fresh Cream Frozen in a Freezer Set to −80° C.

<Production of Frozen Fresh Cream to be Whipped>
<<Cooling Step>>

As fresh cream, there was provided the same product as FRESH CREAM 38 used in Referential Example 1.

The cooling unit used was a freezer set to −80° C. (product of Asahi Life Science, REVCO ultra-low temperature freezer, ULT-1386-5-A41).

The change in the temperature (core temperature) of the fresh cream in the cooling step was measured in the same manner as in Example 1.

The cooling step was performed until the core temperature of the fresh cream became −80° C., and the obtained frozen fresh cream to be whipped was stored in a freezer set to −20° C.

The time required that the core temperature of the fresh cream was changed from 0° C. to −5° C. in the cooling step was 14 minutes, and the cooling rate was 0.36° C./min.

The time required that the core temperature of the fresh cream was changed from 0° C. to −20° C. in the cooling step was 48 minutes, and the cooling rate was 0.42° C./min.

The time required that the core temperature of the fresh cream was changed from −5° C. to −20° C. in the cooling step was 34 minutes, and the cooling rate was 0.44° C./min.

The change in the core temperature of the fresh cream in the cooling step is shown in FIG. 2. In FIG. 2, "E" indicates a graph of the change in the core temperature of the fresh cream in the cooling step of Comparative Example 3.

<Production of Whipped Cream>
<<Thawing Step>>

After stored in the freezer set to −20° C., the frozen fresh cream to be whipped was thawed by being left to stand still for 48 hours in a refrigerator set to 5° C.

—Evaluation of Properties of Cream—

After the container of the fresh cream had been opened, the thawed fresh cream was visually observed for properties. It was found that there were solids attached to the inner surface of the container and there were numerous aggregates in the liquid.

<<Whipping Step>>

The procedure of the whipping step of Referential Example 1 was repeated, except that the fresh cream of Referential Example 1 was changed to the thawed fresh cream of Comparative Example 3, to thereby produce whipped cream.

—Evaluation of Whipped Cream+
——Over-Run——

In the same manner as in Referential Example 1, the over-run (%) of the whipped cream was calculated from the above equation (1) and was found to be 96%.

——Organoleptic Evaluation++

In the same manner as in Example 1, the whipped cream was evaluated for smoothness and melt-in-the-mouth. As a result, the smoothness and the melt-in-the-mouth were respectively 1 and 1 as averages of the evaluation scores given by the 5 panelists.

The whipped cream of Comparative Example 3 was found to give rough feeling on the tongue and be oily.

The following Table 1 collectively shows the conditions and results of Referential Example, Examples, and Comparative Examples.

TABLE 1

| | | Ref. Ex. 1 (Control) | Ex. 1 | Ex. 2 | Comp. Ex. 1 | Comp. Ex. 2 | Comp. Ex. 3 |
|---|---|---|---|---|---|---|---|
| Freezing unit | | — | Liquid nitrogen | Liquid nitrogen | Freezer (−20° C.) | Freezer (−40° C.) | Freezer (−80° C.) |
| Terminal temp. of cooling | | — | −20° C. | −20° C. | −20° C. | −40° C. | −80° C. |
| Time required to reach each temp. | 0° C. → −5° C. | — | 4.2 min | 2.9 min | 48 min | 28 min | 14 min |
| | 0° C. → −20° C. | — | 11.6 min | 22.8 min | 116 min | 68 min | 48 min |
| | −5° C. → −20° C. | — | 7.4 min | 19.9 min | 68 min | 40 min | 34 min |
| Thawing method | | — | Fridge (5° C.), 48 hours | Fridge (5° C.), 48 hours | Fridge (5° C.), 48 hours | Fridge (5° C.), 48 hours | Fridge (5° C.), 48 hours |
| Properties of cream | | Smooth and there were no solids attached to the inner surface of the container | Smooth and there were no solids attached to the inner surface of the container | Smooth and there were no solids attached to the inner surface of the container | There were solids attached to the inner surface of the container and there were numerous aggregates in the liquid | There were solids attached to the inner surface of the container and there were numerous aggregates in the liquid | There were solids attached to the inner surface of the container and there were numerous aggregates in the liquid |
| Over-run (%) | | 114 | 114 | 106 | 98 | 103 | 96 |
| Organoleptic evaluation | Smoothness | 3 | 3 | 3 | 2 | 1 | 1 |
| | Melt-in-the-mouth | 3 | 3 | 2 | 1 | 1 | 1 |
| | Comments | | Smooth feeling on the tongue, No granular feeling | Smooth feeling on the tongue, No granular feeling | Smooth feeling on the tongue, No granular feeling, Somewhat oily | Rough on the tongue, Oily | Rough on the tongue, Oily | Rough on the tongue, Oily |

From the results of Referential Example, Examples, and Comparative Examples, the frozen fresh cream to be whipped produced by the methods of Examples 1 and 2, where the core temperature of the fresh cream had been changed from 0° C. to −5° C. for 8 minutes or shorter, was found to be almost comparable to the whipped cream prepared from the unfrozen fresh cream of Referential Example 1 (control) in terms of properties of cream after thawing and the over-run and organoleptic evaluation when formed into whipped cream.

Furthermore, the frozen fresh cream to be whipped produced by the method of Example 1, where the cooling time of the core temperature of the fresh cream from −5° C. to −20° C. had been shorter than that of the method of Example 2, was found to be closer to the whipped cream prepared from the unfrozen fresh cream of Referential Example 1 (control) in terms of the over-run and melt-in-the-mouth.

In contrast, the frozen fresh cream to be whipped produced by the methods of Comparative Examples 1 to 3, where the core temperature of the fresh cream had been changed from 0° C. to −5° C. for longer than 8 minutes, was found to be inferior to Referential Example and Examples 1 and 2 in terms of any of properties of cream after thawing and the over-run and organoleptic evaluation when formed into whipped cream.

The method of the present invention for producing frozen fresh cream to be whipped can produce frozen fresh cream to be whipped which can be frozen for storage, which is comparable to refrigerated fresh cream in properties of cream after thawed, and which is comparable to whipped cream prepared by whipping refrigerated fresh cream in qualities such as smoothness and melt-in-the-mouth when formed into whipped cream.

Also, the method of the present invention for producing whipped cream can whipped cream which can be used in, for example, decoration of cakes.

What is claimed is:

1. A method for producing frozen fresh cream to be whipped, the method comprising:
    cooling fresh cream,
    wherein in the cooling, the fresh cream is cooled to a temperature of −20° C. or lower,
    a first cooling rate of the fresh cream from 0° C. to −5° C. is from 1.0° C./min. to 6° C./min.,
    a second cooling rate of the fresh cream from −5° C. to −20° C. is from 1.7° C./min. to 3° C./min., wherein the second cooling rate is different from the first cooling rate, and
    wherein the temperature of the fresh cream is a core temperature of the fresh cream.

2. The method according to claim 1, wherein the cooling is performed by cooling the fresh cream in a cooling device comprising a container,
    wherein the temperature in the container of the cooling device is adjusted to from −100° C. to −130° C.

3. The method according to claim 1, wherein the cooling is performed using liquid nitrogen.

4. A method for producing whipped cream, the method comprising:
    thawing at a temperature from 3° C. to 10° C. frozen fresh cream to be whipped; and
    whipping the thawed fresh cream obtained in the thawing,
    wherein the frozen fresh cream to be whipped is produced by a method comprising: cooling fresh cream,
        wherein in the cooling, the fresh cream is cooled to a temperature of −20° C. or lower,
        a first cooling rate of the fresh cream from 0° C. to −5° C. is from 1.0° C./min. to 6° C./min., and
        a second cooling rate of the fresh cream from −5° C. to −20° C. is from 1.7° C./min. to 3° C./min., wherein the second cooling rate is different from the first cooling rate, and
    wherein the temperature of the fresh cream is a core temperature of the fresh cream.

5. The method according to claim 4, wherein the cooling is performed by cooling the fresh cream in a cooling device comprising a container,
    wherein the temperature in the container of the cooling device is adjusted to from −100° C. to −130° C.

6. The method according to claim 4, wherein the cooling is performed using liquid nitrogen.

* * * * *